United States Patent
Jeon et al.

(10) Patent No.: US 12,335,944 B2
(45) Date of Patent: Jun. 17, 2025

(54) FREQUENCY ADJUSTMENT IN WIRELESS TRANSMISSION AND RECEPTION

(71) Applicant: Samsung Electronics Co., Ltd., Suwon-si (KR)

(72) Inventors: Jeongho Jeon, San Jose, CA (US); Andrew Park, London (GB); Eunsun Kim, Austin, TX (US); Qiaoyang Ye, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 927 days.

(21) Appl. No.: 17/449,233

(22) Filed: Sep. 28, 2021

(65) Prior Publication Data

US 2022/0104233 A1    Mar. 31, 2022

Related U.S. Application Data

(60) Provisional application No. 63/105,109, filed on Oct. 23, 2020, provisional application No. 63/085,635, filed on Sep. 30, 2020.

(51) Int. Cl.
*H04W 72/232*    (2023.01)
*H04L 5/00*    (2006.01)
(Continued)

(52) U.S. Cl.
CPC ....... *H04W 72/1273* (2013.01); *H04L 5/0051* (2013.01); *H04W 72/044* (2013.01);
(Continued)

(58) Field of Classification Search
CPC ........... H04W 72/1273; H04W 72/044; H04W 72/23; H04W 72/54; H04W 84/06; H04W 72/232
See application file for complete search history.

(56) References Cited

U.S. PATENT DOCUMENTS

| | | | |
|---|---|---|---|
| 2010/0035600 A1* | 2/2010 | Hou ....................... | H04B 7/024 455/562.1 |
| 2013/0142054 A1* | 6/2013 | Ahmadi ................ | H04W 60/00 370/252 |

(Continued)

FOREIGN PATENT DOCUMENTS

| | | |
|---|---|---|
| WO | 2020024295 A1 | 2/2020 |
| WO | 2021008673 A1 | 1/2021 |

OTHER PUBLICATIONS

3GPP TSG-RAN WG2#107bis, R2-1913945 Title: Running CR on On-demand SI procedure in RRC_CoNNECTED (Year: 2019).*
(Continued)

*Primary Examiner* — Faruk Hamza
*Assistant Examiner* — Abusayeed M Haque

(57) ABSTRACT

Timing adjustments or frequency offsets that at least partially compensate for Doppler shift (e.g., due to distance of a satellite transmitter or relative speed of a terrestrial receiver) of a signal, physical channel, or resource during wireless transmission are configured. The characteristics compensated comprise one of resource element (RE) mapping, channel state information reference signal (CSI-RS) configuration, bandwidth part (BWP) configuration, or control resource set (CORESET) configuration. Information indicating the multiple configurations is transmitted from a base station (BS) to at least one user equipment (UE). The timing adjustments or frequency offsets are specifically configured for one UE, a group of UEs, or the UEs served by a single serving cell. Joint transmission from multiple cells/TRPs/spotbeams may involve partial/full subcarrier alignment.

20 Claims, 10 Drawing Sheets

(51) Int. Cl.
  *H04W 72/044*   (2023.01)
  *H04W 72/0457*  (2023.01)
  *H04W 72/1273*  (2023.01)
  *H04W 72/23*    (2023.01)
  *H04W 72/54*    (2023.01)
  *H04W 84/06*    (2009.01)

(52) U.S. Cl.
  CPC ........... *H04W 72/23* (2023.01); *H04W 72/54* (2023.01); *H04W 84/06* (2013.01)

(56) References Cited

U.S. PATENT DOCUMENTS

| | | | |
|---|---|---|---|
| 2015/0023265 | A1 | 1/2015 | Park et al. |
| 2015/0189533 | A1* | 7/2015 | Fehske .................. H04W 16/18 370/229 |
| 2017/0187426 | A1* | 6/2017 | Su ......................... H04B 1/3822 |
| 2017/0208560 | A1* | 7/2017 | Papa ................... H04W 56/006 |
| 2017/0303296 | A1* | 10/2017 | Prasad ................ H04W 52/146 |
| 2020/0029291 | A1 | 1/2020 | Siomina |
| 2020/0053752 | A1 | 2/2020 | Huang et al. |
| 2020/0128539 | A1 | 4/2020 | Abedini et al. |
| 2021/0051730 | A1* | 2/2021 | Zhang ................. H04L 27/2686 |
| 2022/0248358 | A1 | 8/2022 | Laddu |

OTHER PUBLICATIONS

3GPP TSG-RAN WG2#106e, R1-2107895 Title:QCL/TCI-related enhancement on Inter-cell Multi-TRP operations. (Year: 2021).*
"3rd Generation Partnership Project; Technical Specification Group Radio Access Network; Study on New Radio (NR) to support non-terrestrial networks, (Release 15)", 3GPP TR 38.811 V15.4.0, Sep. 2020, 127 pages.
"3rd Generation Partnership Project; Technical Specification Group Radio Access Network; Solutions for NR to support non-terrestrial networks (NTN) (Release 16)", 3GPP TR 38.821 V16.1.0, May 2021, 140 pages.
"Solutions for NR to support non-terrestrial networks (NTN)", 3GPP TSG RAN meeting #86, RP-193234, Sitges, Spain, Dec. 9-13, 2019, 10 pages.
"New Study WID on NB-IoT/eTMC support for NTN", 3GPP TSG RAN meeting #86, RP-193235, Sitges, Spain, Dec. 9-31, 2019, 4 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
"3rd Generation Partnership Project; Technical Specification Group Radio Access Network; NR; Physical layer procedures for data (Release 16)", 3GPP TS 38.214 V16.6.0, Jun. 2021, 172 pages.
Extended European Search Report issued Sep. 21, 2023 regarding Application No. 21876056.9, 13 pages.
CATT, "Remaining issues on BWP operation", 3GPP TSG RAN WG1 Meeting NR Ad Hoc, R1-1800262, Jan. 2018, 3 pages.
International Search Report and Written Opinion issued Jan. 17, 2022 regarding International Application No. PCT/KR2021/013461, 6 pages.
Fraunhofer HHI et al., "Multi-TRP for Enhanced Mobility", 3GPP TSG RAN Meeting #84, RP-191341, Jun. 2019, 5 pages.
European Patent Office, Communication pursuant to Article 94(3) EPC issued Apr. 1, 2025 regarding Application No. 21876056.9, 6 pages, Apr. 28, 2025.

* cited by examiner

FREQUENCY ADJUSTMENT IN WIRELESS TRANSMISSION AND RECEPTION

CROSS-REFERENCE TO RELATED APPLICATION AND CLAIM OF PRIORITY

This application claims priority under 35 U.S.C. § 119(e) to U.S. Provisional Patent Application No. 63/085,635 filed Sep. 30, 2020 and U.S. Provisional Patent Application No. 63/105,109 filed Oct. 23, 2020. The above-identified patent document(s) are incorporated herein by reference.

TECHNICAL FIELD

The present disclosure relates generally to electronic devices and methods on frequency offset adjustment, and more specifically to indication of frequency offset adjustment for frequency domain RE mapping, CSI-RS resource configuration, CORESET configuration, and BWP configuration.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Multiple Timing adjustments or frequency offsets that each at least partially compensate for Doppler shift (e.g., due to distance of a satellite transmitter or relative speed of a terrestrial receiver) of a signal, physical channel, or resource during wireless transmission are configured. The characteristics compensated comprise one of resource element (RE) mapping, channel state information reference signal (CSI-RS) configuration, bandwidth part (BWP) configuration, or control resource set (CORESET) configuration. Information indicating the multiple configurations is transmitted from a base station (BS) to at least one user equipment (UE). The timing adjustments or frequency offsets are specifically configured for one UE, a group of UEs, or the UEs served by a single serving cell. Joint transmission from multiple cells/TRPs/spotbeams may involve partial/full subcarrier alignment.

In one embodiment, a first transmission-reception point (TRP) that is configured for joint transmission or reception between multiple TRPs includes a processor configured to apply one of a timing adjustment or a frequency offset between the TRPs for one or more of signals, channels, or resources, and a transceiver operatively coupled to the processor. The transceiver is configured to signal to a second TRP one of an applied timing adjustment or frequency offset value or a requested timing adjustment or frequency offset value, signal to at least one user equipment (UE) the timing adjustment or frequency offset value to apply for transmission or reception of the one or more of the signals, channels, or resources, and transmit the one or more of the signals, channels, or resources jointly with the second TRP on one or more frequencies.

In another embodiment, a user equipment (UE) configured for joint transmission or reception with multiple transmission-reception points (TRPs) includes a transceiver configured to receive a timing adjustment or frequency offset value to be applied for transmission or reception of one or more of signals, channels, or resources transmitted by a first TRP jointly with a second TRP, and receive the one or more of the signals, channels, or resources from the first TRP and the second TRP on one or more frequencies. The UE includes a processor configured to apply one of the timing adjustment or frequency offset the received one or more of the signals, channels, or resources.

In a third embodiment, a method performed by a first transmission-reception point (TRP) configured for of joint transmission or reception between multiple TRPs includes: applying one of a timing adjustment or a frequency offset between the TRPs for one or more of signals, channels, or resources; signaling to a second TRP one of an applied timing adjustment or frequency offset value or a requested timing adjustment or frequency offset value; signaling to at least one user equipment (UE) the timing adjustment or frequency offset value to be applied for transmission or reception of the one or more of the signals, channels, or resources; and transmitting the one or more of the signals, channels, or resources jointly with the second TRP on one or more frequencies.

The first and second TRPs may be one of satellites or beams within a satellite. The signaling of a timing adjustment value may be in units of one of symbol duration, sampling time duration, or seconds. The signaling of a frequency adjustment value may be in units of one of subcarrier spacing or Hertz (Hz).

The one or more of the signals, channels, or resources may correspond to one or more of: a physical downlink shared channel (PDSCH), a physical uplink shared channel (PUSCH), or another data channel; or a physical downlink control channel (PDCCH), a physical uplink control channel (PUCCH), or another control channel. The UE may be configured with one or multiple configurations of data or control channel resource element (RE) mapping(s) with a corresponding timing adjustment or frequency offset value. The UE may be indicated on which configuration to apply for transmission or reception of the one or more of the signals, channels, or resources.

The one or more of the signals, channels, or resources may correspond to one of a channel state information reference signal (CSI-RS), a tracking reference signal (TRS), a demodulation reference signal (DMRS), a sounding reference signal (SRS), or another reference signal. In case that the one or more of the signals, channels, or resources corresponds to the CSI-RS, the UE may be configured with one or multiple CSI processes with a corresponding CSI-RS resource configuration including a timing adjustment or frequency offset value, and the UE may be periodically or aperiodically triggered to measure the CSI-RS with an indicated configuration and to transmit a CSI measurement report.

The one or more of the signals, channels, or resources may correspond to a bandwidth part (BWP). The UE may be configured with one or multiple BWP configurations with a corresponding timing adjustment or frequency offset value, and the UE may be indicated on which configuration to apply for downlink (DL) or uplink (UL) BWP switching for transmission or reception.

The one or more of the signals, channels, or resources may correspond to a control resource set (CORESET), the UE may be configured with one or multiple CORESET configurations with a corresponding timing adjustment or frequency offset value, and the UE may be indicated on which configuration to apply for reception of downlink control information (DCI).

The first TRP preferably signals time/frequency resource scheduled for the joint transmission or reception and the timing adjustment or frequency offset value applied for the joint transmission or reception to the second TRP. The second TRP preferably determines a required amount of timing adjustment or frequency offset values to align a transmission or reception by the second TRP with the joint transmission or reception by the first TRP. The first TRP and one or multiple of other TPRs including the second TRP preferably jointly transmit or receive the one or more of the signals, channels, or resources to or from one or multiple UEs including the UE.

The second TRP may at least one of determine a timing adjustment or frequency offset value such that the one or more of the signals, channels, or resources jointly transmitted by the first and second TRPs are received in time or frequency alignment at one or multiple UEs including the UE, partially or fully overlap a joint transmission or reception in time or frequency with the first TRP, and/or signal a transmission power level over partially or fully overlapped time and/or frequency resource. The first TRP may determine a transmission power level according to the signaling from one or multiple other TRPs including the second TRP.

A transmission power level determination by the UE may be performed to evenly distribute a reception power level at the UE over scheduled time/frequency resource(s).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
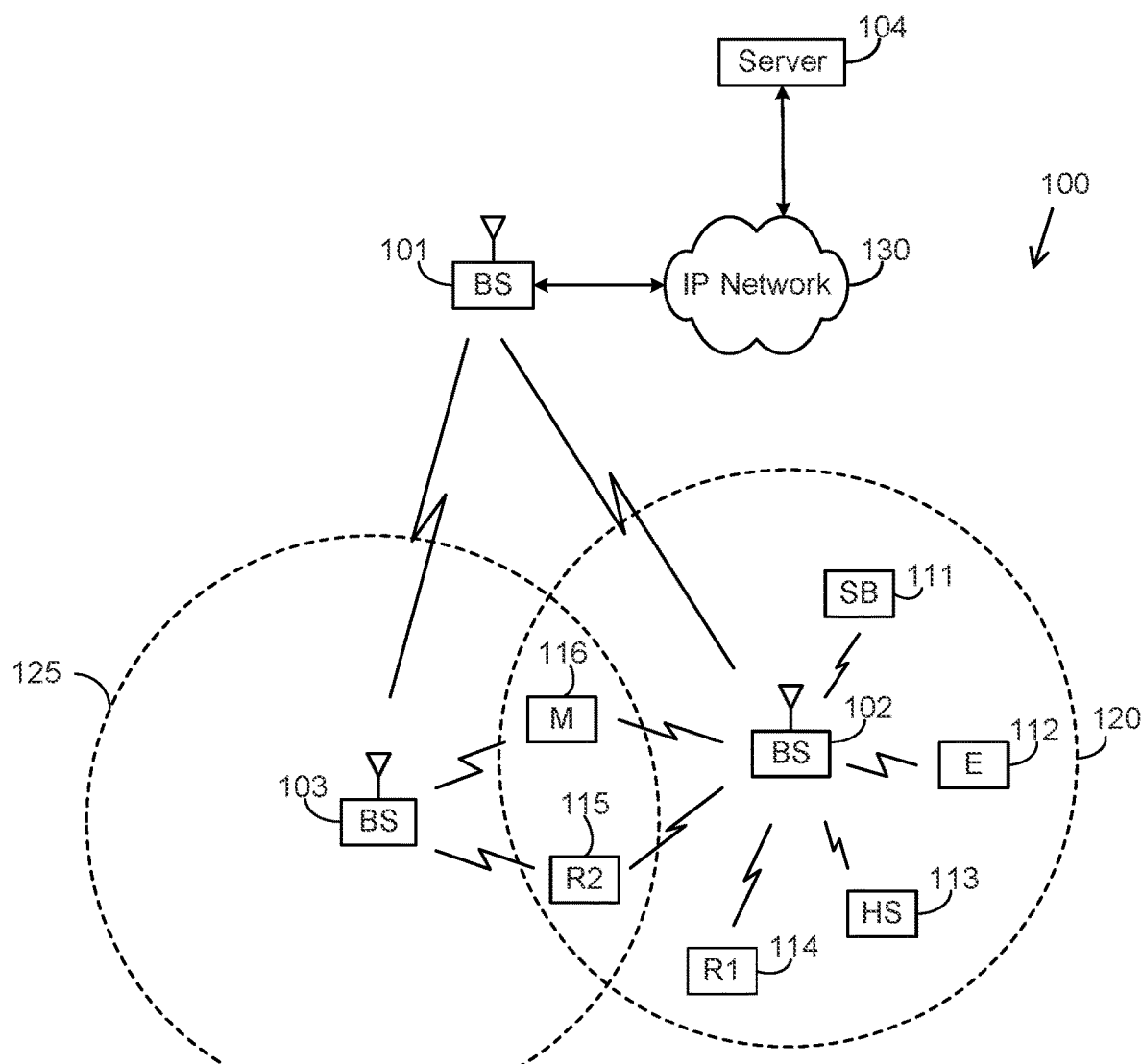
FIG. 1 illustrates an exemplary networked system utilizing frequency and timing adjustment in wireless transmission and reception according to embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP, TR 38.811, Study on NR to support non-terrestrial networks.
[2] 3GPP, TR 38.821, Solutions for NR to support non-terrestrial networks (NTN).
[3] RP-193234, Solutions for NR to support non-terrestrial networks (NTN), Thales, RAN #86, December 2019.
[4] RP-193235, New study WID on NB-IoT/eMTC support for NTN, MediaTek Inc., RAN #86, December 2019.
[5] 3GPP, TS 38.331, 5G; NR; Radio Resource Control (RRC); Protocol specification.
[6] 3GPP, TS 38.214, 5G; NR; Physical layer procedures for data.

The above-identified references are incorporated herein by reference.

Abbreviations

NTN non-terrestrial networks
BS Base Station
UE User Equipment
NR New Radio
3GPP 3rd Generation Partnership Project
WI Work Item
SI Study Item
LEO Low Earth Orbiting
MEO Medium Earth Orbiting
GEO Geostationary Earth Orbiting
TBS Transport Block Size
MCS Modulation and Coding Scheme
SIB System Information Block
DCI Downlink Control Information
PDCCH Physical Downlink Control Channel
PDSCH Physical Downlink Shared Channel
PUCCH Physical Uplink Control Channel
PUSCH Physical Uplink Shared Channel
RRC Radio Resource Control
MSB Most Significant Bits
LSB Least Significant Bits
DL Downlink
UL Uplink
NB-IoT Narrowband Internet of Things
eMTC Enhanced Machine Type Communication
LTE Long-Term Evolution
PRB Physical Resource Block
NR New Radio
RV Redundancy Version
mTRP Multiple Transmission and Reception Point
PCI Physical Cell ID
CORESET Control Resource Set
BWP Bandwidth Part NTN refers to the networks, or segments of networks, using an airborne or space-borne vehicle to embark a transmission equipment relay node or base station [38.811]. NTN can provide ubiquitous coverage and is less vulnerable to disasters, compared to conventional terrestrial network. There is increasing interest in support of NTN in NB-IoT, eMTC, LTE and 5G systems. 3GPP has completed a study in Rel-15 on NTN deployment scenarios, channel models and potential impact areas on NR to support NTN [38.811]. Based on the outcomes of the TR [38.811], 3GPP further conducted a study in Rel-16 on a set of necessary features/adaptations to support NTN in NR [38.821]. In Rel-17, a WI for NTN in NR [RP-193234] and a SI for NB-IoT/eMTC support for NTN [RP-193235] have been approved.

Due to the large distance between the satellites and UEs, link budget can be limited in NTN systems compared to conventional terrestrial networks. Link budget enhancements should be considered.

CoMP transmission and reception is a feature to improve coverage, cell-edge throughput, and system throughput. First introduced as an advanced feature to LTE, CoMP takes advantage of multiple geographical transmission points to improve the link performance. A common scenario would be a UE positioned at a cell edge between two neighboring cells, presenting the worst case scenario with the UE the furthest away from the signal source. The various CoMP techniques can be categorized largely into three groups: coordinated scheduling/coordinated beamforming (CS/CB), dynamic point selection (DPS), and joint transmission (JT) [1].

Each technique takes a slightly different approach on how to utilize the coordination. In JT, data is simultaneously transmitted from multiple points to a single UE or multiple UEs. In DPS, the data is available simultaneously from multiple points, however the data is only transmitted from one point. In CS/CB, data is available and transmitted only from one point with scheduling/beamforming to determine which point will be transmitting to ensure no interference [1].

The subject matter of this disclosure can be applied to scenarios where the wireless communication between the network and the UE experiences high frequency offset due to, e.g., Doppler shift, and the network applies different amount of frequency offset pre-compensation between the neighboring cells. Such scenarios in cellular communication includes but not limited to:
  The case when the group of UEs move with high-speed, e.g., high-speed train, hyperloop, airplane, etc.
  The case when the transmission-reception points (TRPs) move with high-speed, e.g., satellites, airborne base stations.

In the above cases, the approaching cell and departing cell will experience different Doppler shift values for a given location whether the mobility is on the group of UEs or the TRPs. In such cases, the network can apply different frequency offset pre-compensation values to neighboring cells to help the UE to experience less drastic frequency offset between the cells.

For those including but not limited to the above-listed cases, the techniques of this disclosure can be used for the following specific situations, which should be interpreted in a non-limiting sense:
  CoMP transmission amongst multiple cells including at least JT, DPS, etc.
  When a UE's main serving cell, beam, or TRP is changed.
  The UE moving at high speed with respect to the corresponding cell will have a location dependent varying Doppler value, which is either due to the UE's movement or BS's movement, leading to a frequency offset between the data received from the serving cell and the data received from the neighboring cell. In conventional signaling for a UE with a (relatively) fixed spatial relationship with the serving cell, the UE is assigned resource blocks following instructions received in the DCI. In conventional systems for a UE with a varying serving cell relationship, i.e., multi-TRP, but with low mobility, the signals received at the UE from different TRPs are aligned in the frequency domain. On the other hand, for a UE with a varying serving cell relationship and with high mobility, the signals received at the UE from different TRPs may not be aligned in the frequency domain. For reception of signals from TRPs other than the serving cell, indication of frequency offset between the signals from the serving cell and other TRPs is needed, to enable the UE to adjust the frequency domain reception window and receive the signal from other TRPs accordingly [4]. This is also true when a UE is in the process of updating the serving cell relationship, including the change of serving cell, beam, or TRP with the same or different PCI.

Additionally, in order for the network to understand the channel quality and which channel to use, the network needs the channel state information (CSI). This is particularly true in mTRP transmission as there are multiple scenarios in which TRP is signaling. The mTRPs could be signaling exclusively (CS/CB) or they could be signaling simultaneously (JT). Thus, multiple CSI processes can be extended and configured for the network to understand the different hypothetical channel conditions for the various set of TRPs involved in the actual transmission. For the serving cell, the CSI-RS is a pattern configured within the time-frequency grid. The neighboring cell has a frequency offset and a CSI-RS pattern skewed compared to the serving cell. It becomes difficult to locate the neighboring cell's signals. To find the signals, either the time-frequency grid has to be exhaustively searched (which is not efficient) or the frequency offset is adjusted [4].

CoMP enhancement is not limited only to LTE applications. Rel-16 NR introduced multi-DCI for mTRPs. A UE can be scheduled with fully/partially/non-overlapped DCIs from the mTRPs. Each TRP has a different control resource set (CORESET), a set of physical resources concentrated in a specific region of the frequency domain indicating where the DCI is located. Since different TRPs may have different Doppler values, the CORESET should be configured with an indication of the frequency offset for UEs to detect DCIs from different TRPs accordingly [5].

In the case of satellite communication, a satellite can have multiple active spot beams, each of which can be considered as a cell in a cellular communication. For the case of CoMP between multiple spot beams of a satellite, the physical transmission and reception point for a UE is identical. Therefore, the Doppler shift at UE from the two spot beams would not be different. However, the network can apply different Doppler pre-compensation values to spot beams resulting in a frequency gap between the signals received from the two spot beams. In this case, however, the frequency gap is a function of pre-compensation values, which is under network's control, and not UE-specific. For the case of CoMP between multiple spot beams of more than one satellite, the frequency gap between the received signals at a UE will be UE-specific.

This disclosure describes techniques, apparatuses and methods for support of frequency offset adjustment, specifically the support for a given physical channel, signal, or resource, using one or multiple configurations with different frequency offset values and dynamic indication on which configuration is to be applied for transmission and reception. The disclosed techniques, apparatuses and methods can be applied not only to NTN systems, but also to any other wireless communication systems.

FIG. 1 illustrates an exemplary networked system utilizing frequency and timing adjustment in wireless transmission and reception according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network. Each BS 101, 102 and 103 may be terrestrial, and the wireless network 100 may be a terrestrial network, or at least BS 102 and/or BS 103 may be non-terrestrial (e.g., airborne or spaceborne), and the wireless network 100 may be an NTN, in embodiments of the present disclosure.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. One or more of UEs 111, 112, 113, 114, 115, and 116 may be moving at high speed relative to BS 102 and/or BS 103, such as on a high speed train, in embodiments of the present disclosure. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
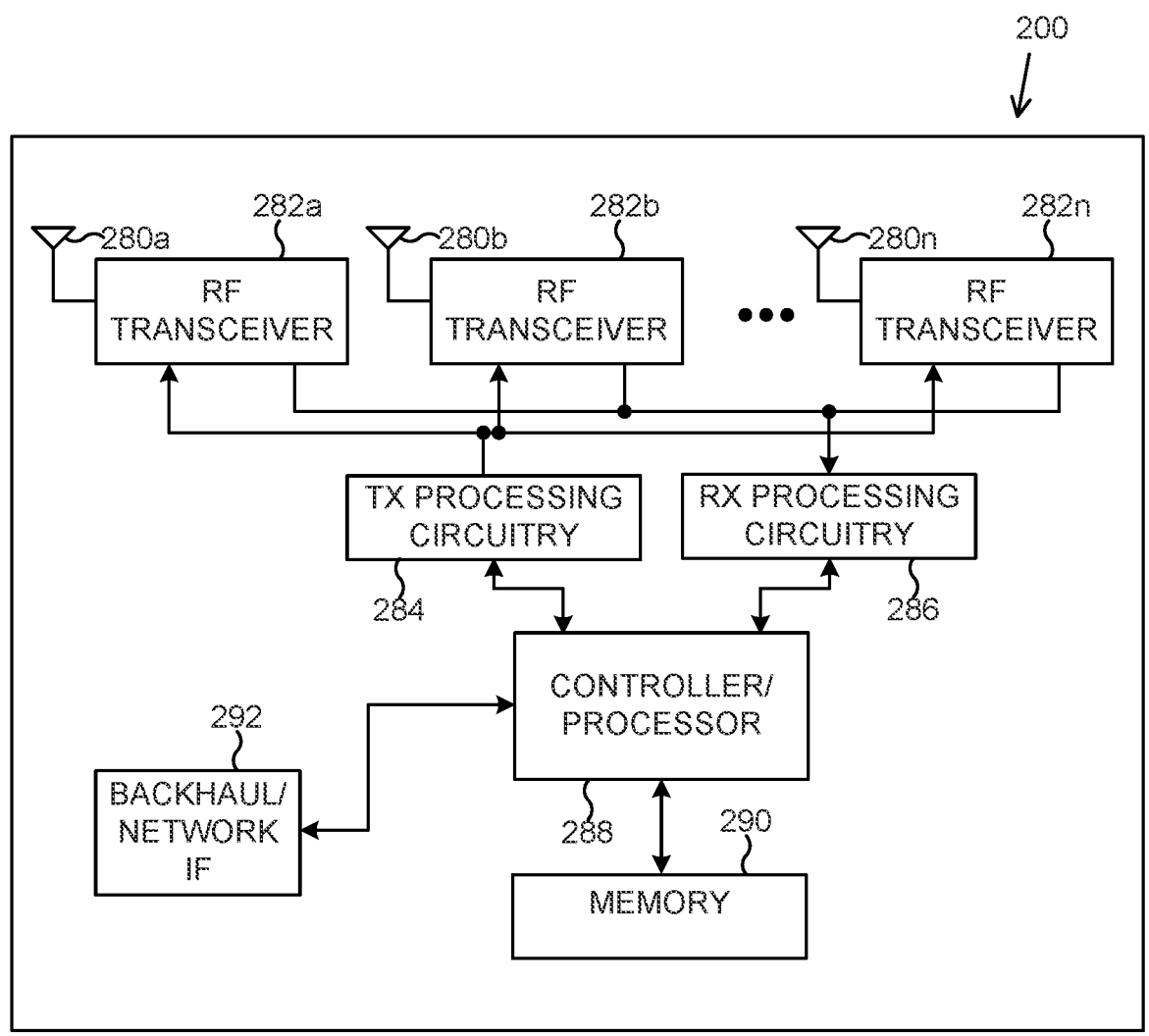
FIG. 2 illustrates an exemplary base station (BS) utilizing frequency and timing adjustment in wireless transmission and reception according to embodiments of this disclosure.

FIG. 2 illustrates an exemplary base station (BS) utilizing frequency and timing adjustment in wireless transmission and reception according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280a-280n, multiple radio frequency (RF) transceivers 282a-282n, transmit (TX or Tx) processing circuitry 284, and receive (RX or Rx) processing circuitry 286. The BS 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
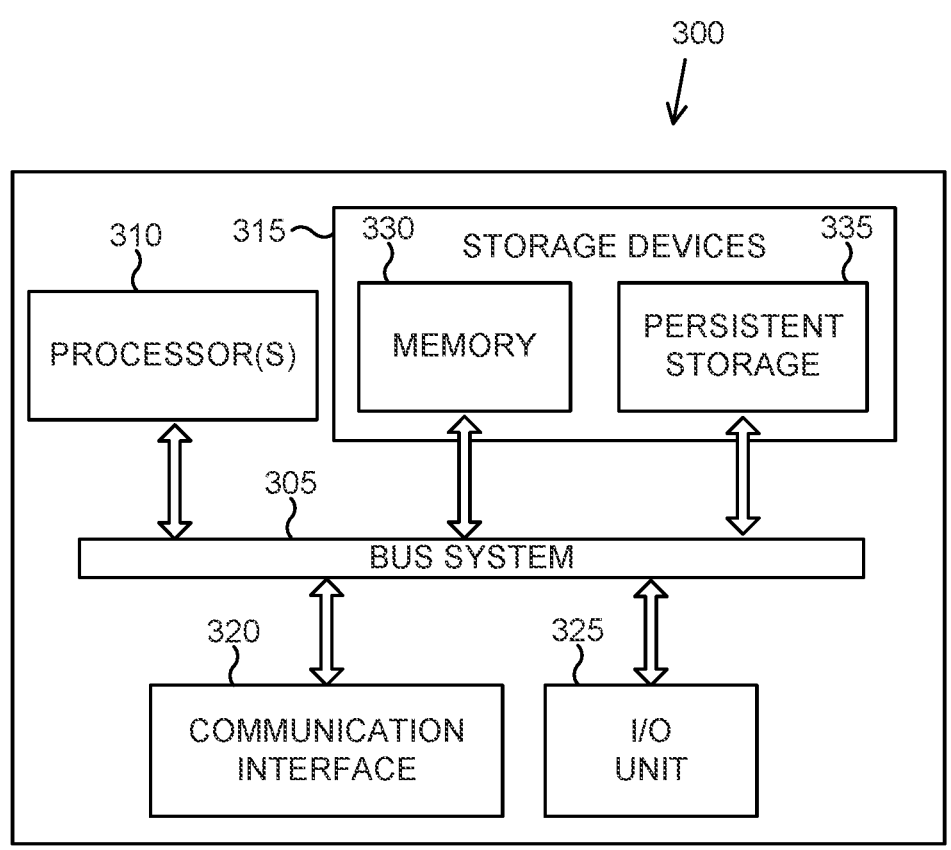
FIG. 3 illustrates an exemplary electronic device for communicating in the networked computing system utilizing frequency and timing adjustment in wireless transmission and reception according to embodiments of this disclosure.

FIG. 3 illustrates an exemplary electronic device for communicating in the networked computing system utilizing frequency and timing adjustment in wireless transmission and reception according to various embodiments of this disclosure. In one embodiment, the electronic device 300 is a user equipment implemented as a mobile device, which can represent one of the UEs 111, 112, 113, 114, 115 and 116 in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

Although FIG. 3 illustrates an example of an electronic device 300 in a wireless system including a plurality of such electronic devices, such as UEs 111, 112, 113, 114, 115 and 116 in FIG. 1, various changes may be made to FIG. 3. For example, various components in FIG. 3 can be combined, further subdivided, or omitted and additional components could be added according to particular needs. In addition, as with computing and communication networks, electronic devices can come in a wide variety of configurations, and FIG. 3 does not limit this disclosure to any particular electronic device.

The disclosed designs below can be applied not only to NTN systems, but also to any other wireless communication systems implemented as illustrated by FIGS. 1 through 3. The examples for NTN systems should be considered in inclusive manner, without exclusion of other wireless communication systems. For example, the disclosed methods can be applied to both LTE and NR, or any future or existing communication systems with high mobility at either UEs, BSs or both.

Figure 4:
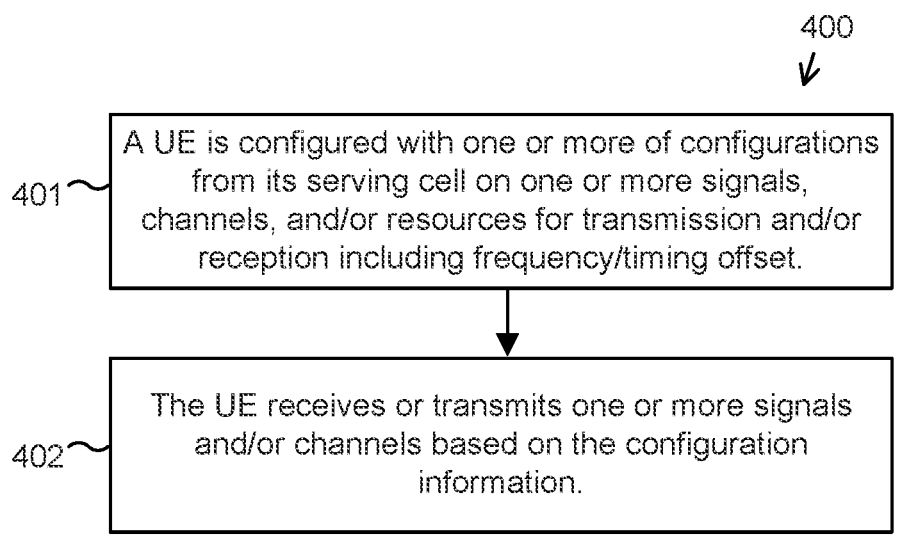
FIG. 4 illustrates a high level flowchart from a UE perspective for frequency and/or timing adjustment in wireless transmission and reception according to embodiments of this disclosure.

FIG. 4 illustrates a high level flowchart from a UE perspective for frequency and/or timing adjustment in wireless transmission and reception according to various embodiments of this disclosure. The embodiment of FIG. 4 is for illustration only. Other embodiments of the process 400 could be used without departing from the scope of this disclosure.

In the process 400, the subcarrier offset is configured to UE by serving cell on various signals, channels, and resources, and the UE applies the configured frequency offset in the transmission or reception. The frequency offset can be, for example, expressed in the unit of subcarrier spacing, which can be fixed or varied depending on the system configuration. It should be interpreted that different units of frequency amount other than the subcarrier spacing can be used for the signaling as well. The process 400 is described from UE perspective. At operation 401, signals, channels, and/or resources include but not limited to any DL/UL physical channels in LTE/NR, any reference signals in LTE/NR, and any resource configuration, e.g., CORESET, BWP, etc. At operation 401, the UE is configured with frequency offset that will be applied in adjusting frequency domain resource grid for transmission or reception. At operation 402, the UE applies configured frequency offset to adjust the frequency domain resource grid for transmission or reception.

Figure 5:
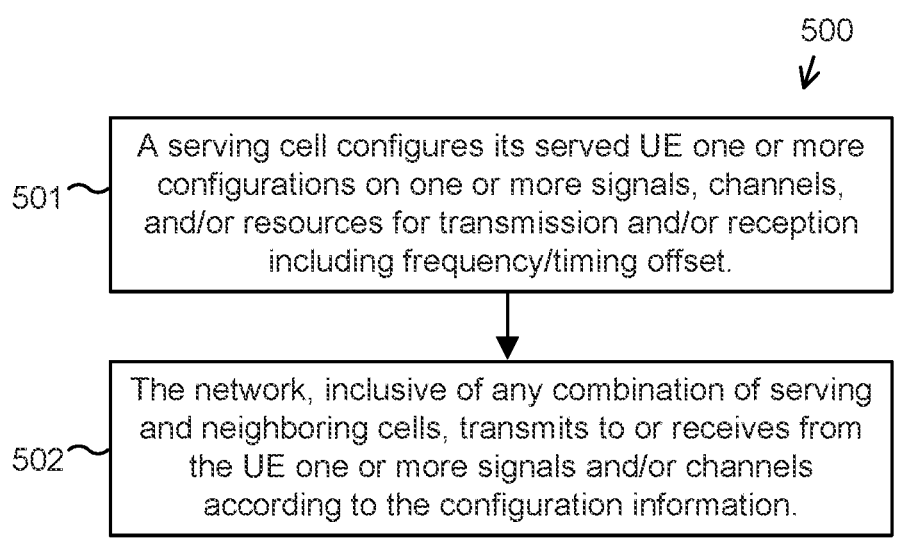
FIG. 5 illustrates a high level flowchart from a network perspective for frequency and/or timing adjustment in wireless transmission and reception according to embodiments of this disclosure.

The counterpart to process 400 is described, in connection with process 500 in FIG. 5, from the network perspective.

FIG. 5 illustrates a high level flowchart from a network perspective for frequency and/or timing adjustment in wireless transmission and reception according to various embodiments of this disclosure. The embodiment of FIG. 5 is for illustration only. Other embodiments of the process 500 could be used without departing from the scope of this disclosure.

At operation 501 of process 500, the network configures different configurations for various signals, channels, and/or resources as described earlier to UE with corresponding frequency offset. As an example, each configuration may correspond to transmission from or reception by different TRPs, cells, or beams experiencing different frequency offset values. At operation 502, the network transmits to or receives from the UE according to the configuration including the frequency offset. According to the configuration at operation 501, the actual transmission or reception point may be the serving cell/TRP/beam, neighboring cell/TRP/beam, or any combination of them. The UE may or may not know which cell(s)/TRP(s)/beam(s) are involved in the transmission/reception.

As an example, multiple satellites/spot beams may apply different timing advancement values towards a geographical serving area. When adjacent satellites/spot beams perform joint transmission for a UE, e.g., on the boundary of serving areas from the two adjacent satellites/spot beams, the transmitted signals from different satellites/spot beams may not be effectively combined at the UE if the difference in time-of-arrival of signals from different satellites/spot beams is greater than the cyclic prefix duration of OFDM symbol. Therefore, this timing adjustment from an adjacent satellite/spot beam will be needed in order to effectively perform joint transmission in such a case.

Figure 6:
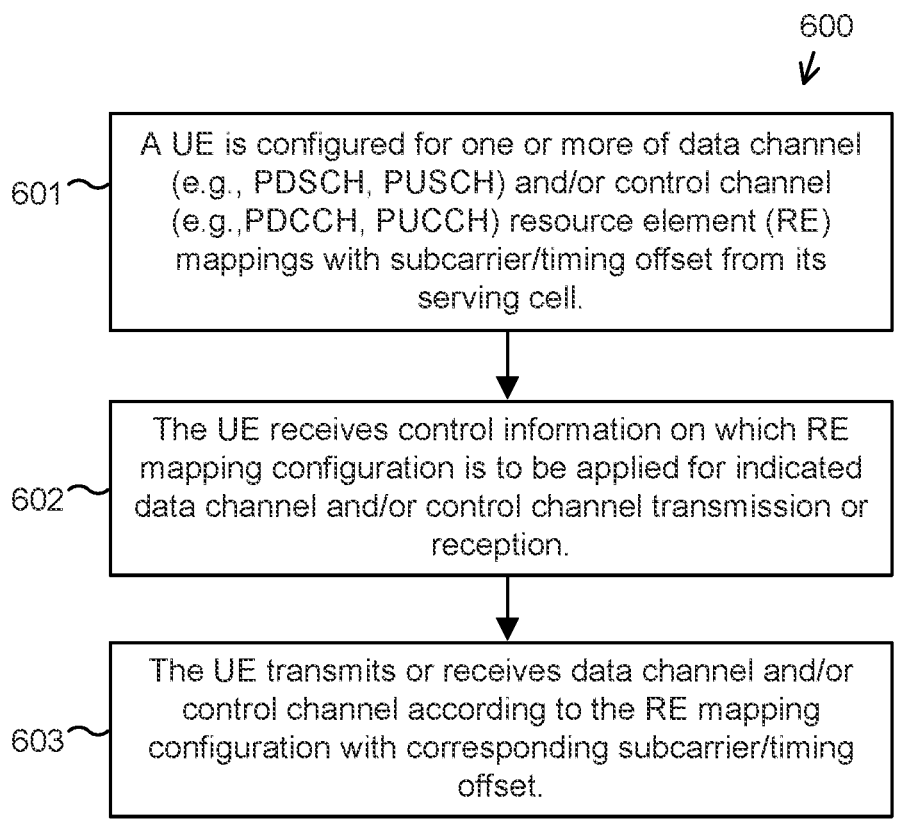
FIG. 6 illustrates a high level flowchart from a UE perspective for subcarrier offset adjustment for RE mapping according to embodiments of this disclosure.

FIG. 6 illustrates a high level flowchart from a UE perspective for subcarrier/timing offset adjustment for RE mapping according to various embodiments of this disclosure. The embodiment of FIG. 6 is for illustration only. Other embodiments of the process 600 could be used without departing from the scope of this disclosure.

Figure 7:
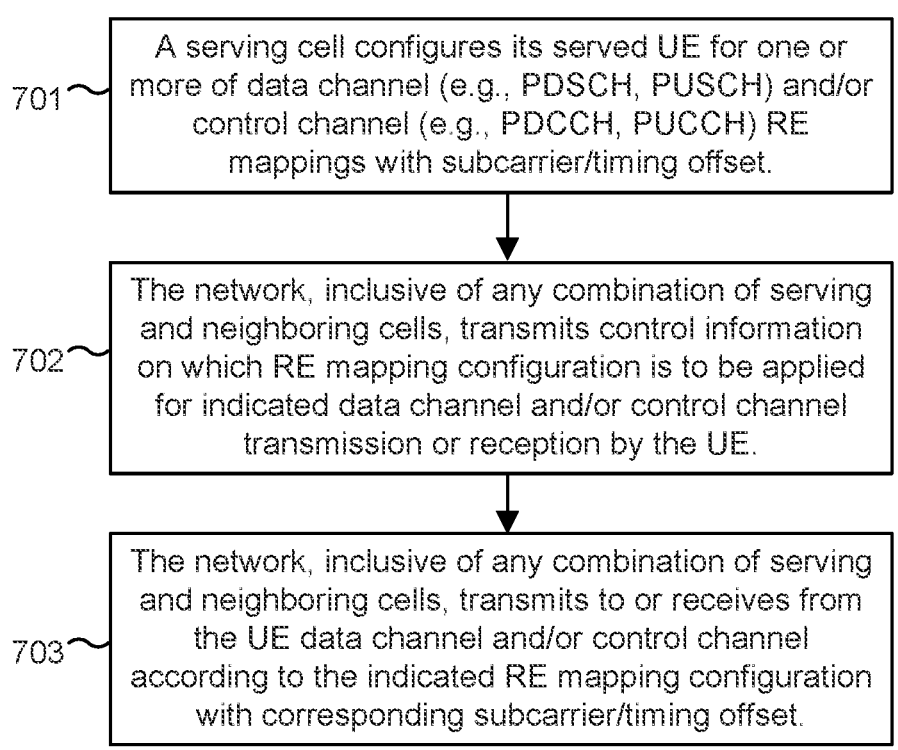
FIG. 7 illustrates a high level flowchart from a network perspective for subcarrier offset adjustment for RE mapping according to embodiments of this disclosure.

FIG. 7 illustrates a high level flowchart from a network perspective for subcarrier/timing offset adjustment for RE mapping according to various embodiments of this disclosure. The embodiment of FIG. 7 is for illustration only. Other embodiments of the process 700 could be used without departing from the scope of this disclosure.

At operation 701 of FIG. 7, the network configures multiple configurations of RE mapping for a given physical channel with corresponding subcarrier/timing offset. As an example, each configuration may correspond to transmission from or reception by different TRPs, cells, or beams experiencing different frequency offset values. The UE may or may not know which cell(s)/TRP(s)/beam(s) are involved in the transmission/reception. At operation 702, the network indicates the UE via, e.g., DCI or MAC CE, on which RE mapping configuration is to be applied for indicated physical channel transmission or reception. At operation 703, the network transmits to or receives from the UE according to the indicated configuration with subcarrier/timing offset at operation 702. According to the configuration indicated at operation 701, the actual transmission or reception point may be the serving cell/TRP/beam, neighboring cell/TRP/beam, or any combination thereof.

The physical channels included in the flowcharts of FIGS. 6 and 7, i.e., PDSCH/PUSCH/PDCCH/PUCCH should be interpreted as an example and can be any other physical channel defined in LTE/NR. The frequency offset was expressed in the units of subcarrier spacing as an example.

An exemplary modification of the information element (IE) PDSCH-Config to include subcarrier offset indication is presented below:

```
PDSCH-RE-MappingQCL-Config-r11 ::=        SEQUENCE {
    pdsch-RE-MappingQCL-ConfigId-r11      PDSCH-RE-MappingQCL-
                ConfigId-r11,
    optionalSetOfFields-r11               SEQUENCE {
        crs-PortsCount-r11                        ENUMERATED {n1, n2,
                n4, spare1},
        crs-FreqShift-r11                         INTEGER (0..5),
        mbsfn-SubframeConfigList-r11      CHOICE {
            release                               NULL,
            setup                         SEQUENCE {
                subframeConfigList                MBSFN-
                        SubframeConfigList
            }
        }                                         OPTIONAL, -- Need ON
        pdsch-Start-r11                   ENUMERATED {reserved, n1,
                n2, n3, n4, assigned}
        SubcarrierOffset                          INTEGER (0..X)
        TimingOffset                              INTEGER (0..X)
    }                                             OPTIONAL, -- Need OP
    csi-RS-ConfigZPId-r11                 CSI-RS-ConfigZPId-r11,
    qcl-CSI-RS-ConfigNZPId-r11            CSI-RS-ConfigNZPId-r11
                        OPTIONAL, -- Need OR
    ...
}
```

At operation 601 of FIG. 6, the UE is configured with multiple RE mapping configurations for a given physical channel with corresponding subcarrier/timing offset. At operation 602, the UE receives control information, e.g., DCI or medium access control (MAC) control element (CE), on which RE mapping configuration is to be applied for indicated physical channel transmission or reception. At operation 603, the UE applies the configured frequency/timing offset to adjust the frequency/time domain resource grid for transmission or reception of the corresponding physical channel.

The counterpart to process 600 is described, in connection with process 700 in FIG. 7, from the network perspective.

A UE can be configured with one or multiple of such 'PDSCH-RE-MappingQCL-Config' with different 'SubcarrierOffset' and 'TimingOffset' values. The example above is an LTE PDSCH example. The same principle can be applied to any other physical channels from LTE/NR or any current/future wireless systems. Among multiple configured RE mapping configurations, the UE is indicated by the network via, e.g., DCI or MAC CE, on which mapping configuration is to be applied for the transmission or reception of the corresponding physical channel. After reception of such indication, the UE applies indicated subcarrier offset to resource block grid with respect to the serving cell or default configuration and performs data transmission/reception accordingly. The indicated subcarrier/timing offset value(s) can be either negative or positive.

The network can utilize such indication for CoMP transmission/reception. As the transmitting/receiving cell/TRP/beam changes dynamically, i.e., DPS, the network can signal to UE the appropriate RE mapping and subcarrier/timing offset configuration for the corresponding transmitting/receiving cell/TRP/beam. The same principle can be applied to JT in which the actual set of participating cell(s)/TRP(s)/beam(s) are aligning transmission for the indicated RE mapping and subcarrier/timing offset configuration. JT can be transparent to UE, i.e., the UE may not know the actual set of participating cell(s)/TRP(s)/beam(s).

In LTE/NR, multiple CSI processes can be configured for a UE. The CSI-RS resources can be configured for different number of antenna ports and various time/frequency locations. The possible time/frequency locations of CSI-RS resources are not fully flexible, but follows one of the defined configuration pattern in the specification. To indicate the CSI-RS resource pattern having frequency shift from one of the defined configuration patterns, the subcarrier/timing offset is indicated in the CSI process configuration.

Figure 8:
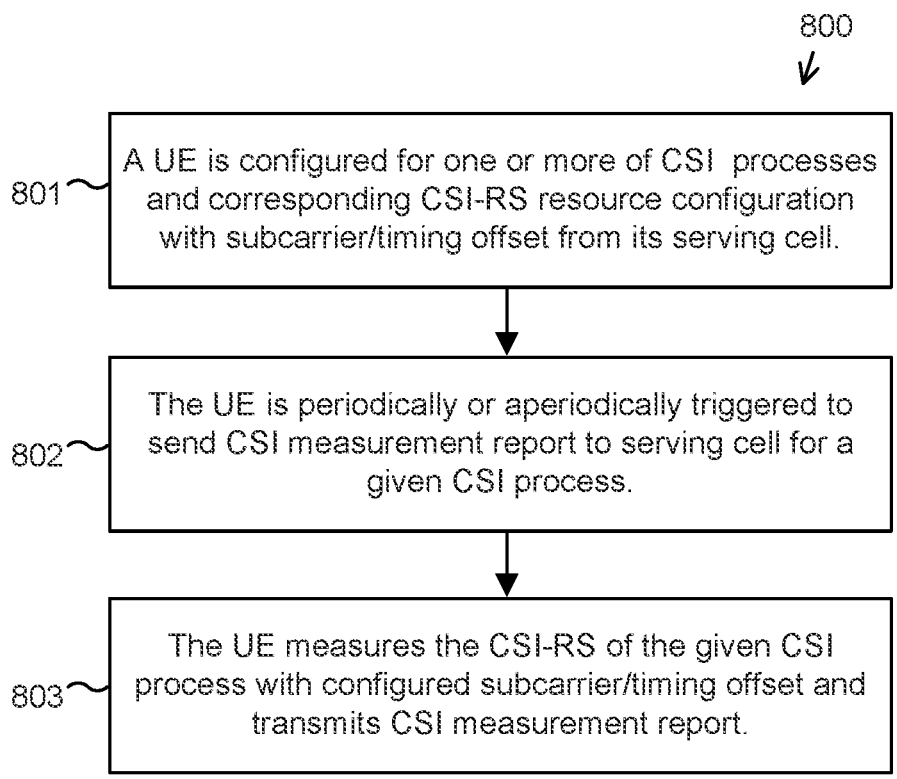
FIG. 8 illustrates a high level flowchart from a UE perspective for CSI process configuration with subcarrier offset and triggering measurement report according to embodiments of this disclosure.

FIG. 8 illustrates a high level flowchart from a UE perspective for CSI process configuration with subcarrier/timing offset and triggering measurement report according to various embodiments of this disclosure. The embodiment of subcarrier/timing offset adjustment for CSI processes in FIG. 8 is for illustration only. Other embodiments of the process 800 could be used without departing from the scope of this disclosure.

Figure 9:
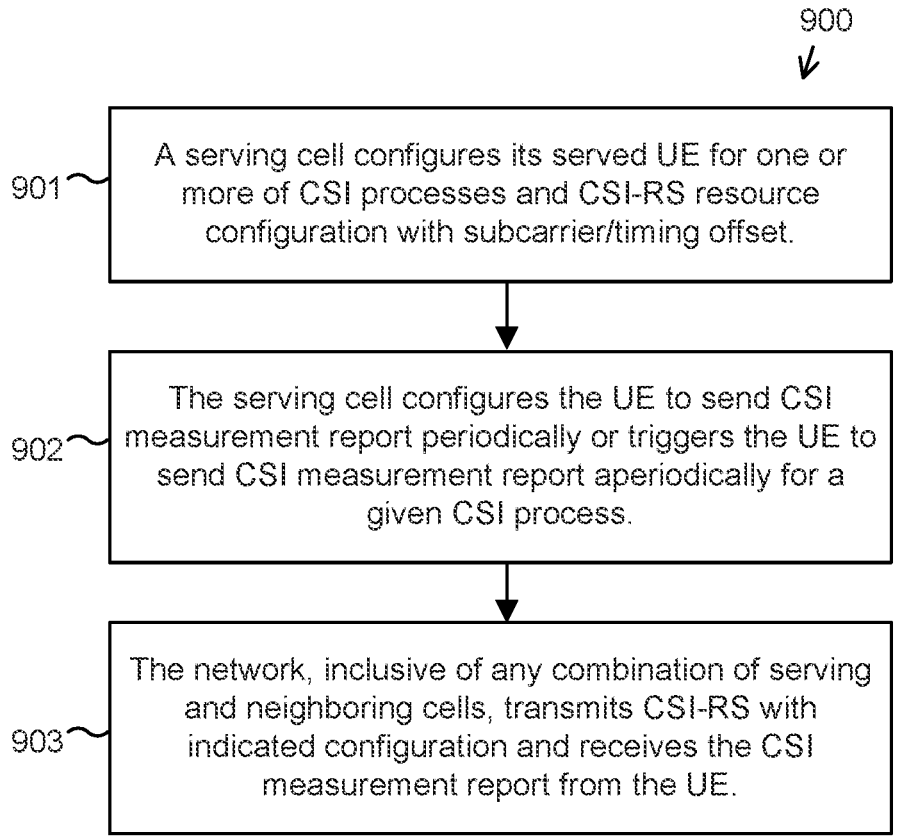
FIG. 9 illustrates a high level flowchart from a network perspective for CSI process configuration with subcarrier offset and triggering measurement report according to embodiments of this disclosure.

FIG. 9 is for illustration only. Other embodiments of the process 900 could be used without departing from the scope of this disclosure.

At operation 901 in FIG. 9, the network configures multiple CSI processes and corresponding CSI-RS resource configuration with corresponding subcarrier/timing offset. As an example, each configuration may correspond to transmission of CSI-RS from different TRPs, cells, or beams experiencing different frequency offset values. The UE may or may not know which set of cell(s)/TRP(s)/beam(s) are involved in the transmission of CSI-RS. At operation 902, the network indicates the UE via, e.g., RRC or DCI, on which CSI process is to be measured and reported at a given instance. At operation 903, the network transmits CSI-RS of a certain CSI process at the given instance with corresponding resource configuration and subcarrier offset and receives the measurement report from the UE.

The examples in FIGS. 8 and 9 are for CSI-RS, but the same principle disclosed in this embodiment can be applied to any DL/UL reference signals such as cell-specific reference signals (CRS), tracking reference signals (TRS), demodulation reference signals (DMRS), sounding reference signals (SRS), etc. The frequency offset is expressed in units of subcarrier spacing for purposes of explanation only.

An exemplary modification of the IE CSI-RS-ConfigNZP to include subcarrier/timing offset indication is presented in Abstract Syntax Notation One (ASN.1) below:

```
-- ANS1START
    CSI-RS-ConfigNZP-r11 ::=            SEQUENCE {
        csi-RS-ConfigNZPId-r11              CSI-RS-ConfigNZPId-r11,
        antennaPortsCount-r11               ENUMERATED {an1, an2, an4, an8},
        resourceConfig-r11                  INTEGER (0..31),
        subcarrierOffset                    INTEGER (0..X)
        timingOffset                        INTEGER (0..X)
        subframeConfig-r11                  INTEGER (0..154),
        scramblingIdentity-r11              INTEGER (0..503),
        qcl-CRS-Info-r11                    SEQUENCE {
            qcl-ScramblingIdentity-r11          INTEGER (0..503),
            crs-PortsCount-r11                      ENUMERATED {n1, n2, n4,
                spare1},
            mbsfn-SubframeConfigList-r11        CHOICE {
                release                             NULL,
                setup                               SEQUENCE {
                    subframeConfigList                  MBSFN-SubframeConfigList
                }
            }                                   OPTIONAL  -- Need ON
        }                                   OPTIONAL,  -- Need OR
        ...
}
-- ASN1STOP
```

At operation 801 in FIG. 8, the UE is configured with multiple CSI processes and corresponding CSI-RS resource configuration with corresponding subcarrier/timing offset. At operation 802, the UE is periodically configured by RRC or aperiodically triggered by DCI to perform CSI measurement and report. At operation 083, the UE applies the configured frequency/time offset to adjust the frequency/time domain resource grid for transmission or reception of the CSI-RS resource of the corresponding CSI process.

The counterpart to process 800 is described, in connection with process 900 in FIG. 9, from the network perspective.

FIG. 9 illustrates a high level flowchart from a network perspective for CSI process configuration with subcarrier/timing offset and triggering measurement report according to various embodiments of this disclosure. The embodiment of subcarrier/timing offset adjustment for CSI processes in A UE can be configured with one or multiple of such 'CSI-RS-ConfigNZP' with different 'SubcarrierOffset' values. The above example is an LTE NZP CSI-RS configuration example. The same principle can be applied to any DL/UL reference signals of LTE/NR or any current/future wireless systems. Among multiple CSI process configurations, the UE is periodically configured or aperiodically triggered via DCI to perform CSI measurement and report for the indicated CSI process. Prior to the measurement, the UE applies corresponding RRC configured subcarrier/timing offset for the reception of CSI-RS with respect to the serving cell or default configuration. The indicated subcarrier/timing offset value can be either negative or positive. The 'subcarrierOffset' field corresponds to additional frequency domain offset in CSI-RS mapping equation in TS 36.211 Section 6.10.5.2, i.e., $k=k'+12 m+\text{subcarrierOffset}$, in number of subcarriers. Zero power CSI-RS (ZP-CSI-RS) can be configured in the same manner as disclosed for non-zero power CSI-RS (NZP-CSI-RS) with subcarrierOffset.

The network can utilize multiple CSI process configurations for CoMP transmission including but not limited to JT and DPS. Using multiple CSI processes, the network can acquire the CSI of different combinations of cell(s)/TRP(s)/beam(s). In the case of JT, the actual set of participating cell(s)/TRP(s)/beam(s) can be transparent to UE, i.e., the UE may not know the actual set of participating cell(s)/TRP(s)/beam(s).

Use of BWPs is a means to adjust UE's operating channel bandwidth. In a network where multiple cells, which may experience different frequency/timing offsets and consequently different frequency/time pre-compensation values, are configured with the same PCI, the BWP can be used as a means for UE to switch between cells without handover. As an example of such network operation, multiple spot beams of a satellite can be configured with the same PCI and the network triggers BWP switching to switch the serving beam for a UE.

Figure 10:
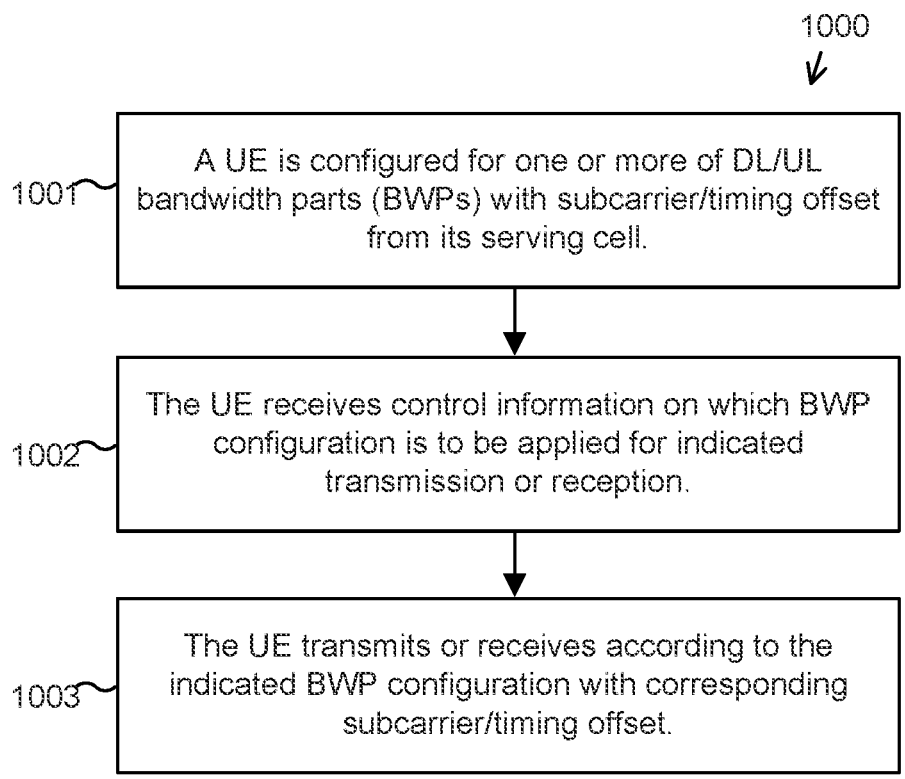
FIG. 10 illustrates a high level flowchart from a UE perspective for BWP configuration with subcarrier offset and switching according to embodiments of this disclosure.

FIG. 10 illustrates a high level flowchart from a UE perspective for BWP configuration with subcarrier/timing offset and switching according to various embodiments of this disclosure. The embodiment of subcarrier/timing offset adjustment for BWP process in FIG. 10 is for illustration only. Other embodiments of the process 1000 could be used without departing from the scope of this disclosure.

At operation 1001 in FIG. 10, the UE is configured with BWP configurations with corresponding subcarrier/timing offset. At operation 1002, the UE receives control information, e.g., DCI, MAC CE, or RRC, on which BWP configuration is to be applied for all channels and reference signals. At operation 1003, the UE applies the configured subcarrier/timing offset to adjust the frequency/time domain location of the indicated BWP and perform any transmission or reception.

Figure 11:
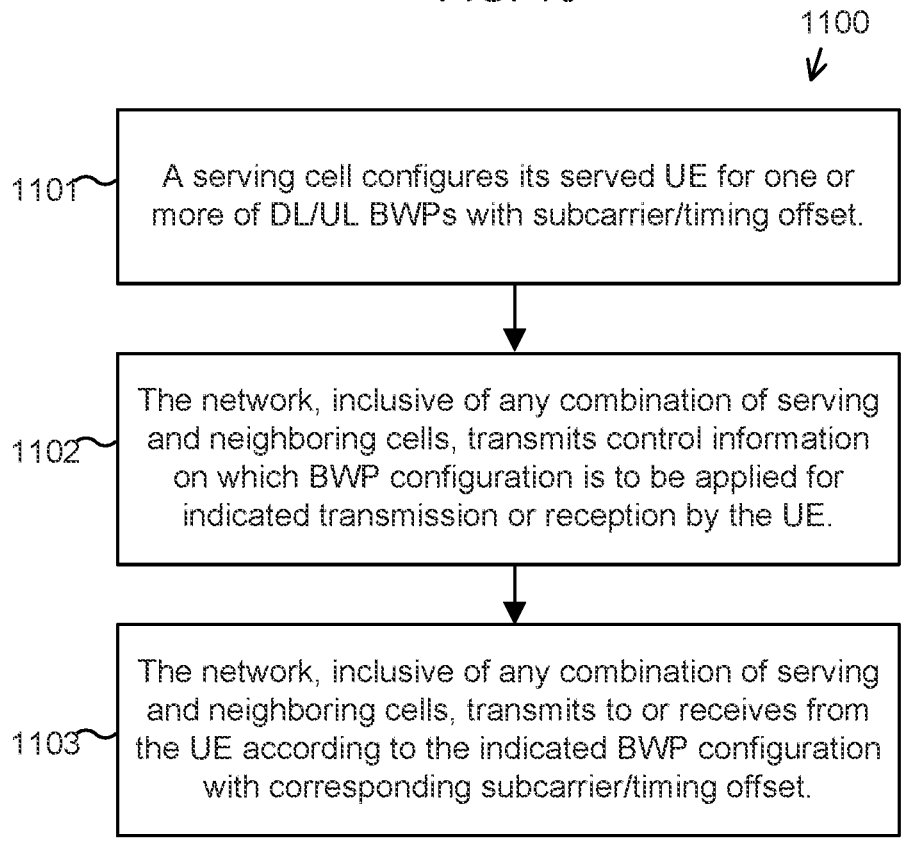
FIG. 11 illustrates a high level flowchart from a network perspective for BWP configuration with subcarrier offset and switching according to embodiments of this disclosure.

The counterpart to process 1000 is described, in connection with process 1100 in FIG. 11, from the network perspective.

FIG. 11 illustrates a high level flowchart from a network perspective for BWP configuration with subcarrier/timing offset and switching according to various embodiments of this disclosure. The embodiment of subcarrier/timing offset adjustment for BWP process in FIG. 11 is for illustration only. Other embodiments of the process 1100 could be used without departing from the scope of this disclosure.

At operation 1101 in FIG. 11, the network configures multiple configurations of BWP with corresponding subcarrier/timing offset to UE. As an example, each configuration may correspond to different TRPs, cells, or beams experiencing different frequency/time offset values. At operation 1102, the network indicates the UE on which BWP configuration is to be applied. At operation 1103, the network transmits to or receives from the UE according to the indicated BWP configuration with subcarrier/timing offset at operation 1102. According to the configuration indicated at operation 1101, the actual serving cell/TRP/beam may be changed.

An exemplary modification of the IE BWP to include subcarrier/timing offset indication is presented in ASN.1 below:

```
-- ASN1START
-- TAG-BWP-START
BWP ::=                    SEQUENCE {
    locationAndBandwidth       INTEGER (0..37949),
    subcarrierSpacing          SubcarrierSpacing,
    subcarrierOffset           INTEGER (0..X),
    timingOffset               INTEGER (0..X),
    cyclicPrefix               ENUMERATED
                                   { extended }
        OPTIONAL    -- Need R
}
-- TAG-BWP-STOP
-- ASN1STOP
```

A UE can be configured with one or multiple of such 'BWP' with different 'SubcarrierOffset' and 'TimingOffset' values. The above example is an NR example. A similar principle can be applied to any current/future wireless systems. Among multiple configured BWP configurations, the UE is indicated by the network via, e.g., DCI, MAC CE or RRC, on which BWP configuration is to be applied. After reception of such indication, the UE assumes newly switched BWP for its transmission or reception and applied corresponding RRC configured subcarrier/timing offset for resource block grid adjustment. Therefore the 'subcarrierOffset' and 'timingOffset' field(s) in this BWP are to be used for all channels and reference signals unless explicitly configured elsewhere. The 'subcarrierOffset' is interpreted in the unit of the configured subcarrierSpacing. The offset value is applied to the indicated locationAndBandwidth configuration in determining the starting position of the configured bandwidth. The indicated subcarrier offset can be interpreted with respect to the default BWP PRB grid configuration. The indicated subcarrier offset value can be either negative or positive.

The CORESET is a time/frequency resource configuration for UE to monitor potential DCI reception from the network. A UE can be configured with multiple CORESETs. In NR mTRP design, a UE can receive DCIs from up to two different TRPs. The DCIs from different TRPs can independently schedule separate HARQ processes to UE with fully/partially/non-overlapped PDSCHs. In satellite communication, two different TRPs can be understood as two different spot beams of a same satellite or different satellite. The network may have applied different frequency/time offset compensation values for two spot beams and, thus, the received DCIs can exhibit frequency/time offset.

Figure 12:
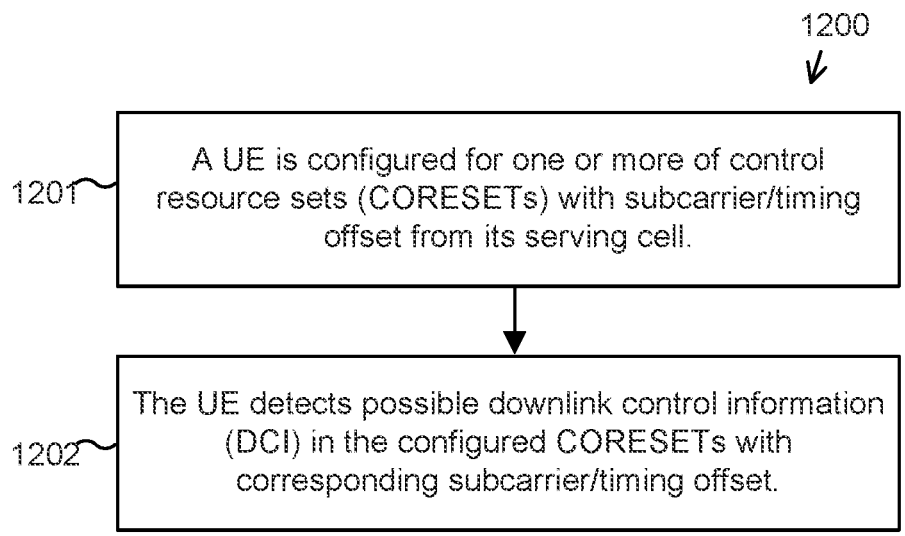
FIG. 12 illustrates a high level flowchart from a UE perspective for CORESET configuration with subcarrier offset according to embodiments of this disclosure.

FIG. 12 illustrates a high level flowchart from a UE perspective for CORESET configuration with subcarrier/timing offset according to various embodiments of this disclosure. The embodiment of subcarrier/timing offset adjustment for CORESET process in FIG. 12 is for illustration only. Other embodiments of the process 1200 could be used without departing from the scope of this disclosure.

At operation 1201 in FIG. 12, the UE is configured with CORESET with corresponding subcarrier/timing offset. At operation 1202, the UE monitors DCI from each configured CORESET with corresponding subcarrier/timing offset.

Figure 13:
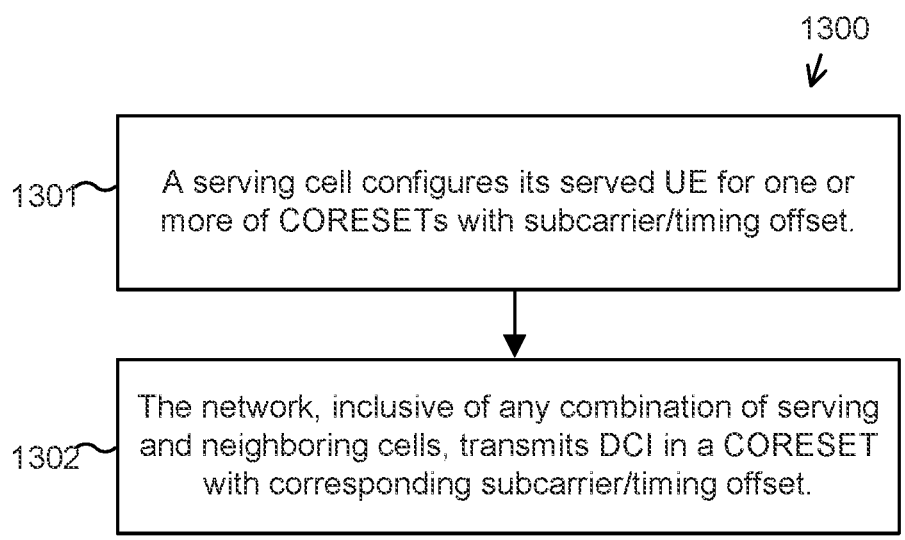
FIG. 13 illustrates a high level flowchart from a network perspective for CORESET configuration with subcarrier offset according to embodiments of this disclosure.

The counterpart to process 1200 is described, in connection with process 1300 in FIG. 13, from the network perspective.

FIG. 13 illustrates a high level flowchart from a network perspective for CORESET configuration with subcarrier/timing offset according to various embodiments of this disclosure. The embodiment of subcarrier/timing offset adjustment for CORESET process in FIG. 13 is for illustration only. Other embodiments of the process 1300 could be used without departing from the scope of this disclosure.

At operation 1301 in FIG. 13, the network configures multiple CORESETs with corresponding subcarrier/timing offset to UE. As an example, each configuration may correspond to different TRPs, cells, or beams experiencing different frequency/timing offset values. At operation 1302, the network transmits DCIs on each CORESET with corresponding subcarrier/timing values.

An exemplary modification of the IE ControlResourceSet to include subcarrier/timing offset indication is presented below:

```
ControlResourceSet ::=             SEQUENCE {
    controlResourceSetId           ControlResourceSetId,
    frequencyDomainResources       BIT STRING (SIZE (45)),
    subcarrierOffset               INTEGER (0..X)
    timingOffset                   INTEGER (0..X)
    duration                       INTEGER (1..maxCoReSetDuration),
    cce-REG-MappingType            CHOICE {
        interleaved                    SEQUENCE {
            reg-BundleSize                 ENUMERATED {n2, n3,
                n6},
            interleaverSize                ENUMERATED {n2, n3,
                n6},
            shiftIndex
                INTEGER(0..maxNrofPhysicalResourceBlocks-1)
                OPTIONAL -- Need S
        },
        nonInterleaved                 NULL
    },
    precoderGranularity            ENUMERATED {sameAsREG-bundle,
        allContiguousRBs},
    tci-StatesPDCCH-ToAddList      SEQUENCE(SIZE (1..maxNrofTCI-
        StatesPDCCH)) OF TCI-StateId OPTIONAL, -- Cond NotSIB1-
        initialBWP
    tci-StatesPDCCH-ToReleaseList  SEQUENCE(SIZE (1..maxNrofTCI-
        StatesPDCCH)) OF TCI-StateId OPTIONAL, -- Cond NotSIB1-
        initialBWP
    tci-PresentInDCI               ENUMERATED {enabled}
        OPTIONAL, -- Need S
    pdcch-DMRS-ScramblingID        INTEGER (0..65535)
        OPTIONAL, -- Need S
    ...
}
```

A UE can be configured with one or multiple of such 'ControlResourceSet' with 'subcarrierOffset' and 'timingOffset' values. When a UE is indicated by the network via DCI, MAC CE, or RRC message to apply a certain CORESET configuration, the UE applies corresponding RRC configured subcarrier/timing offset prior to the reception of PDCCH with respect to the serving cell or default configuration. The 'subcarrierOffset' and 'timingOffset' field(s) correspond to frequency domain offset in number of subcarriers (e.g., Hertz, or any frequency measure) and the time domain offset in the basic time unit (denoted as Ts in NR/LTE specifications, as an example, i.e., sampling time duration, symbol, or any time measure). The indicated value can be positive or negative.

In some embodiments, the network can align joint transmission from multiple cells/TRPs/spotbeams. As the two neighboring cells/TRPs/spotbeams may apply different frequency offset compensation values, the received signal PRB grid may not be aligned at the UE. Moreover, for single frequency network (SFN) manner joint transmission, the signal received on a given tone from two different cells/TRPs/spotbeams needs to be identical. If two different signals are received at a given tone, the signals will interfere with each other.

In one embodiment, the network loads information on tones with subcarrier shift between two cells/TRPs/spotbeams such that the reception at the UE is aligned.

Figure 14A:
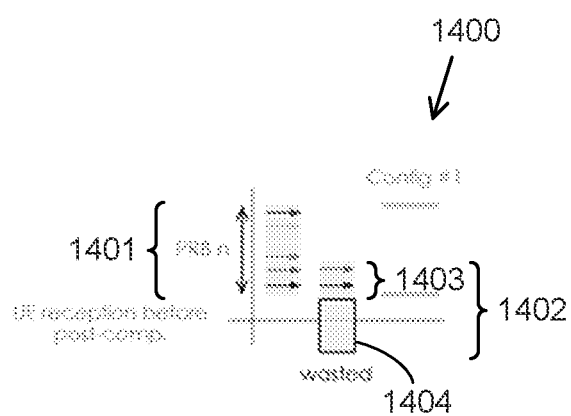
FIGS. 14A and 14B illustrate examples of subcarrier alignment for joint transmission according to various embodiments of this disclosure.
Figure 14B:
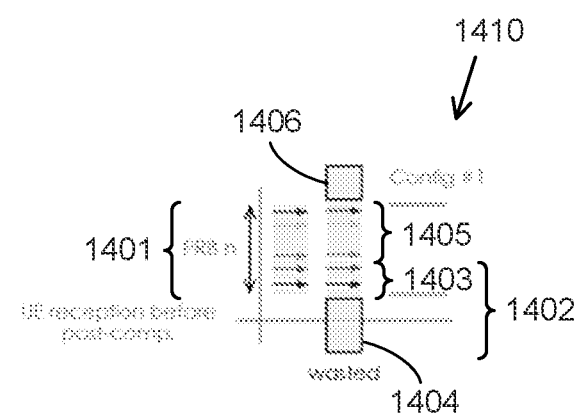

FIGS. 14A and 14B illustrate examples of subcarrier alignment for joint transmission according to various embodiments of this disclosure. Consider two spot beams of a satellite as depicted by configurations 1400, 1410. If the network applies different frequency/timing offset compensation values to the spot beams, the PRB grids 1401, 1402 for PRB n between the two spot beams at a UE will be misaligned as shown. Therefore, the network would need to load information on tones from two spotbeams with corresponding subcarrier/timing shift values, such that the reception will be aligned at the UE. For joint transmission, the same information bit needs to be loaded between multiple TRPs on the same subcarrier. However, due to the different frequency offset applied at different TRPs, if both TRP load same information on the same PRB and subcarrier index, they will not be aligned when received by UE. Denote by n the frequency offset at a second TRP relative to the first TRP in the unit of subcarrier tones. Then information loaded on subcarrier index k at the second TRP would be aligned with information loaded on subcarrier index k+n at the first TRP in a modular manner. The network may partially overlap the transmission by using only the subcarriers 1403 from PRB n on the second beam for JT as illustrated in FIG. 14A, resulting in "wasted" subcarriers 1404. Alternatively, the network may fully overlap the transmission by using the subcarriers 1403 from PRB n and the subcarriers 1405 from PRB n−1 on the second beam for JT as illustrated in FIG. 14B, resulting in wasted subcarriers 1404, 1406. Detailed embodiments for full/partial alignment are disclosed along with the following pair of flowcharts.

Figure 15:
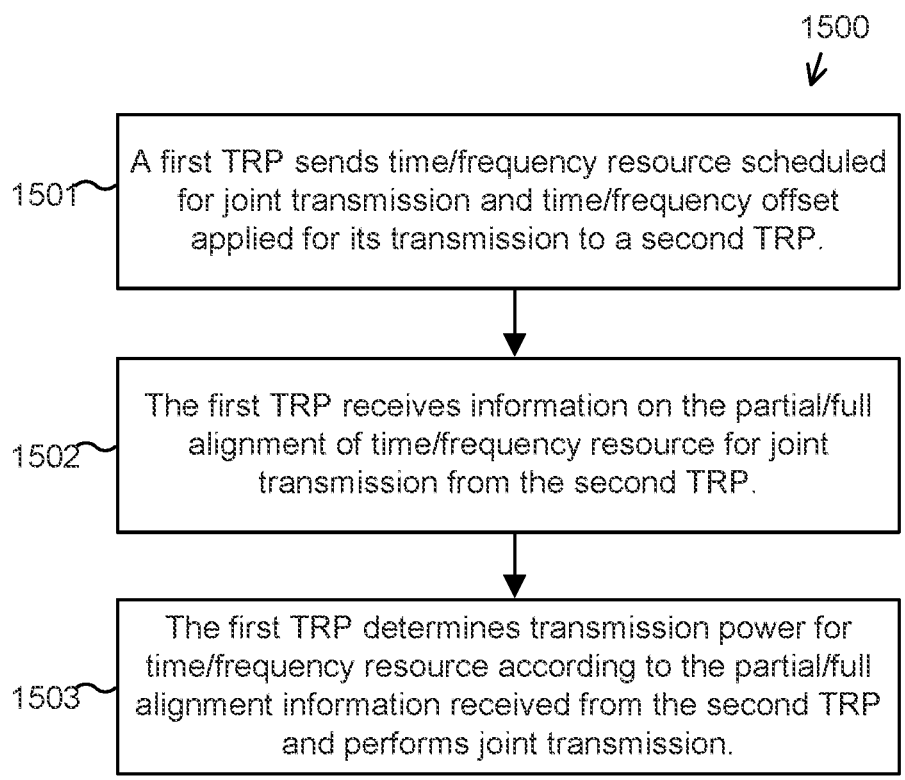
FIG. 15 illustrates a high level flowchart from a UE perspective illustrating coordination for joint transmission between TRPs in the presence of time/frequency offset according to embodiments of this disclosure.

FIG. 15 illustrates a high level flowchart from a UE perspective illustrating coordination for joint transmission between TRPs in the presence of time/frequency offset according to various embodiments of this disclosure. The embodiment of joint transmission between TRPs in the presence of time/frequency offset in FIG. 15 is for illustration only. Other embodiments of the process 1500 could be used without departing from the scope of this disclosure.

At operation 1501, the first TRP informs that TRP's scheduled joint transmission information to participating TRPs. The shared information includes time/frequency resource for transmission as well as time/frequency offset applied to the first TRP's transmission(s). As other TRPs can have different time/frequency offset values applied for the respective transmissions, the other TRPs can determine the needed amount of time/frequency adjustment to align the respective TRP's transmission with the first TRP. With the alignment between TRPs, the multiple transmitted signals can be more effectively combined at the UE. At operation 1502, the first TRP receives information on the partial/full alignment of time/frequency resource for joint transmission from the second TRP. The message exchange between first and second TRPs can occur through X2/Xn interface. For the case of regenerative satellites, the message exchange can occur over the inter-satellite links. At operation 1503, the first TRP determines transmission power for time/frequency resource according to the partial/full alignment information received from the second TRP and performs joint transmission. As illustrated in FIG. 15, the alignment for joint transmission between TRPs can be partial dependent on the second TRP's decision. In this case, the UE will experience power imbalance within received signals over the frequency. To compensate such power imbalance, the first TRP can boost transmission power for partially non-overlap joint transmission.

The counterpart to process 1600 is described, in connection with process 1300 in FIG. 13, from the network perspective.

Figure 16:
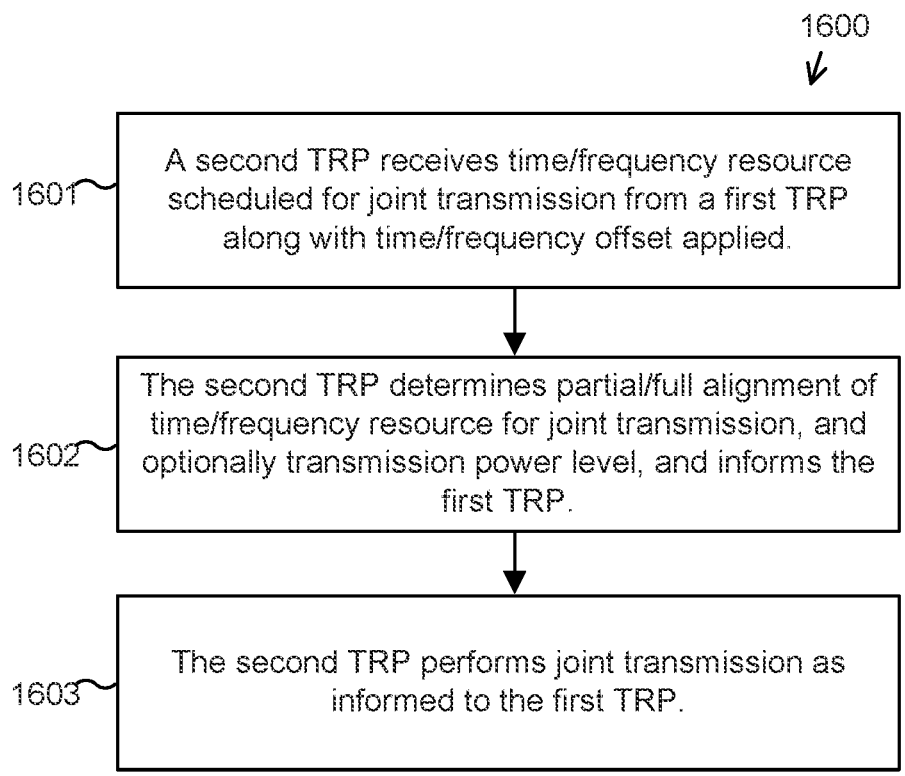
FIG. 16 illustrates a high level flowchart from a network perspective illustrating coordination for joint transmission between TRPs in the presence of time/frequency offset according to embodiments of this disclosure.

FIG. 16 illustrates a high level flowchart from a network perspective illustrating coordination for joint transmission between TRPs in the presence of time/frequency offset according to various embodiments of this disclosure. The embodiment of joint transmission between TRPs in the presence of time/frequency offset in FIG. 16 is for illustration only. Other embodiments of the process 1600 could be used without departing from the scope of this disclosure After the second TRP is informed by the first TRP in operation 1601 on the time/frequency resource for the joint transmission along with the time/frequency offset information, in operation 1602, the second TRP determines partial/full alignment of the second TRP's joint transmission with the first TRP. In case the second TRP is operating at low load and therefore has available resource to relocate other transmissions to other frequency range, the second TRP may determine to fully align the second TRP's transmission with the first TRP as illustrated in the example 1410 in FIG. 14B. Due to different amount of frequency offset applied between different TRPs, the full alignment can result in waste of more guard band frequency resources. If the second TRP is under tight resource availability, the second TRP can determine to perform joint transmission partially in the frequency. In addition, the second TRP may allocate a different amount of power on different over frequency. There information can be communicated with the first TRP in operation 1602. At operation 1603, the second TRP performs joint transmission as informed to the first TRP.

When the serving TRP schedules a UE on its time/frequency resource, it can also indicate the set of participating TRPs for joint transmission. This indication can be either explicit or implicit. In the case of implicit method, the UE can be configured with a set of PDSCH reception configurations, which can be associated with certain CSI process, and the UE can be indicated with the index of PDSCH reception configuration. Each PDSCH reception configuration can be mapped to a certain set of TRPs for joint transmission, which may be transparent to UE. The serving TRP can also indicate the UE whether the joint transmission is fully or partially overlapped. If joint transmission is partially overlapped between TRPs, the UE may perform channel estimation separately on the resource that is fully overlapped and on the resource that is partially overlapped. If joint transmission is fully overlapped, the UE can assume that the channel estimation can be performed across all the bandwidth.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A first transmission-reception point (TRP) for joint transmission or reception between multiple TRPs, the first TRP comprising:
 a processor configured to apply one of a timing adjustment or a frequency offset between the TRPs for one or more of signals, channels, or resources; and
 a transceiver operatively coupled to the processor and configured to
  signal to a second TRP one of the applied timing adjustment or frequency offset value applied by the first TRP or a requested timing adjustment or frequency offset value requested to be applied by the second TRP,
  signal to a user equipment (UE) a timing adjustment or frequency offset value to be applied by the UE for transmission or reception of the one or more of the signals, channels, or resources, and
  transmit the one or more of the signals, channels, or resources jointly with the second TRP on one or more frequencies,
 wherein signaling of timing adjustment values is in units of one of symbol duration, sampling time duration, or seconds, and signaling of frequency adjustment values is in units of one of subcarrier spacing or Hertz (Hz).

2. The first TRP of claim 1, wherein the first and second TRPs are one of satellites or antennas corresponding to beams within a satellite.

3. The first TRP of claim 1, wherein the one or more of the signals, channels, or resources correspond to one or more of
 a physical downlink shared channel (PDSCH), a physical uplink shared channel (PUSCH), or another data channel, or
 a physical downlink control channel (PDCCH), a physical uplink control channel (PUCCH), or another control channel, wherein one of a plurality of TRPs configures the UE with one or multiple configurations of data or control channel resource element (RE) mapping(s) with a corresponding timing adjustment or frequency offset value, wherein the one of the plurality of TRPs indicates to the UE which configuration to apply for transmission or reception of the one or more of the signals, channels, or resources, and wherein the plurality of TRPs includes the first and second TRPs.

4. The first TRP of claim 1, wherein the one or more of the signals, channels, or resources correspond to one of a channel state information reference signal (CSI-RS), a tracking reference signal (TRS), a demodulation reference signal (DMRS), a sounding reference signal (SRS), or another reference signal, wherein, in case that the one or more of the signals, channels, or resources corresponds to the CSI-RS, one of a plurality of TRPs configures the UE with one or multiple CSI processes with a corresponding CSI-RS resource configuration including the timing adjustment or frequency offset value to be applied by the UE, the one of the plurality of TRPs periodically or aperiodically triggers the UE to measure the CSI-RS with an indicated configuration and to transmit a CSI measurement report, and the plurality of TRPs includes the first and second TRPs.

5. The first TRP of claim 1, wherein the one or more of the signals, channels, or resources correspond to a bandwidth part (BWP), wherein one of a plurality of TRPs configures the UE with one or multiple BWP configurations with the timing adjustment or frequency offset value to be applied by the UE, wherein the one of the plurality of TRPs indicates to the UE which configuration to apply for downlink (DL) or uplink (UL) BWP switching for transmission or reception, and wherein the plurality of TRPs includes the first and second TRPs.

6. The first TRP of claim 1, wherein the one or more of the signals, channels, or resources correspond to a control resource set (CORESET), wherein one of a plurality of TRPs configures the UE with one or multiple CORESET configurations with the timing adjustment or frequency offset value to be applied by the UE, and wherein the one of the plurality of TRPs indicates to the UE which configuration to apply for reception of downlink control information (DCI), and wherein the plurality of TRPs includes the first and second TRPs.

7. The first TRP of claim 1, wherein the first TRP signals a time/frequency resource scheduled for the joint transmission or reception and the timing adjustment or frequency offset value applied by the first TRP for the joint transmission or reception to the second TRP, wherein the second TRP determines a required amount of timing adjustment or frequency offset to align a transmission or reception by the second TRP with the joint transmission or reception by the first TRP, and wherein the first TRP and one or multiple of other TPRs including the second TRP jointly transmit or receive the one or more of the signals, channels, or resources to or from one or multiple UEs including the UE.

8. The first TRP of claim 7, wherein the second TRP at least one of determines the timing adjustment or frequency offset applied by the second TRP such that the one or more of the signals, channels, or resources jointly transmitted by the first and second TRPs are received in time or frequency alignment at one or multiple UEs including the UE, partially or fully overlaps a joint transmission or reception in time or frequency with the first TRP, or signals a transmission power level over partially or fully overlapped time and/or frequency resource, wherein the first TRP determines a transmission power level according to the signaling from one or multiple other TRPs including the second TRP.

9. The first TRP of claim 7, wherein a transmission power level determination by the UE is performed to evenly distribute a reception power level at the UE over scheduled time/frequency resource(s).

10. A user equipment (UE) configured for joint transmission or reception with multiple transmission-reception points (TRPs), the UE comprising:

a transceiver configured to
 receive a timing adjustment or frequency offset value to be applied for transmission or reception of one or more of signals, channels, or resources transmitted by a first TRP jointly with a second TRP, and
 receive the one or more of the signals, channels, or resources from the first TRP and the second TRP on one or more frequencies; and a processor configured to apply one of the timing adjustment or frequency offset to the received one or more of the signals, channels, or resources, wherein signaling of timing adjustment values is in units of one of symbol duration, sampling time duration, or seconds, and signaling of frequency adjustment values is in units of one of subcarrier spacing or Hertz (Hz).

11. The UE of claim 10, wherein the one or more of the signals, channels, or resources correspond to one or more of a physical downlink shared channel (PDSCH), a physical uplink shared channel (PUSCH), or another data channel, or a physical downlink control channel (PDCCH), a physical uplink control channel (PUCCH), or another control channel, wherein the UE is configured with one or multiple configurations of data or control channel resource element (RE) mapping(s) with a corresponding timing adjustment or frequency offset value to be applied by the UE, and wherein the UE is indicated on which configuration to apply for transmission or reception of the one or more of the signals, channels, or resources.

12. The UE of claim 10, wherein the one or more of the signals, channels, or resources correspond to one of a channel state information reference signal (CSI-RS), a tracking reference signal (TRS), a demodulation reference signal (DMRS), a sounding reference signal (SRS), or another reference signal, wherein, in case that the one or more of the signals, channels, or resources corresponds to the CSI-RS, the UE is configured with one or multiple CSI processes with a corresponding CSI-RS resource configuration including the timing adjustment or frequency offset value, and the UE is periodically or aperiodically triggered to measure the CSI-RS with an indicated configuration and to transmit a CSI measurement report.

13. The UE of claim 10, wherein the one or more of the signals, channels, or resources correspond to a bandwidth part (BWP),
   wherein the UE is configured with one or multiple BWP configurations with a corresponding timing adjustment or frequency offset value to be applied by the UE, and
   wherein the UE is indicated on which configuration to apply for downlink (DL) or uplink (UL) BWP switching for transmission or reception.

14. The UE of claim 10, wherein the one or more of the signals, channels, or resources correspond to a control resource set (CORESET),
   wherein the UE is configured with one or multiple CORESET configurations with a corresponding timing adjustment or frequency offset value to be applied by the UE, and
   wherein the UE is indicated on which configuration to apply for reception of downlink control information (DCI).

15. A method performed by a first transmission-reception point (TRP) configured for of joint transmission or reception between multiple TRPs, the method comprising:
   applying one of a timing adjustment or a frequency offset between the TRPs for one or more of signals, channels, or resources;
   signaling to a second TRP one of the applied timing adjustment or frequency offset value applied by the first TRP or a requested timing adjustment or frequency offset value requested to be applied by the second TRP;
   signaling to a user equipment (UE) a timing adjustment or frequency offset value to be applied by the UE for transmission or reception of the one or more of the signals, channels, or resources; and
   transmitting the one or more of the signals, channels, or resources jointly with the second TRP on one or more frequencies,
   wherein signaling of timing adjustment values is in units of one of symbol duration, sampling time duration, or seconds, and signaling of frequency adjustment values is in units of one of subcarrier spacing or Hertz (Hz).

16. The method of claim 15, wherein the one or more of the signals, channels, or resources correspond to one or more of
   a physical downlink shared channel (PDSCH), a physical uplink shared channel (PUSCH), or another data channel, or
   a physical downlink control channel (PDCCH), a physical uplink control channel (PUCCH), or another control channel,
   wherein one of a plurality of TRPs configures the UE with one or multiple configurations of data or control channel resource element (RE) mapping(s) with a corresponding timing adjustment or frequency offset value,
   wherein the one of the plurality of TRPs indicates to the UE which configuration to apply for transmission or reception of the one or more of the signals, channels, or resources, and
   wherein the plurality of TRPs includes the first and second TRPs.

17. The method of claim 15, wherein the one or more of the signals, channels, or resources correspond to one of a channel state information reference signal (CSI-RS), a tracking reference signal (TRS), a demodulation reference signal (DMRS), a sounding reference signal (SRS), or another reference signal,
   wherein, in case that the one or more of the signals, channels, or resources corresponds to the CSI-RS,
   one of a plurality of TRPs configures the UE with one or multiple CSI processes with a corresponding CSI-RS resource configuration including the timing adjustment or frequency offset value to be applied by the UE,
   the one of the plurality of TRPs periodically or aperiodically triggers the UE to measure the CSI-RS with an indicated configuration and to transmit a CSI measurement report, and
   the plurality of TRPs includes the first and second TRPs.

18. The method of claim 15, wherein the one or more of the signals, channels, or resources correspond to a bandwidth part (BWP),
   wherein one of a plurality of TRPs configures the UE with one or multiple BWP configurations with the timing adjustment or frequency offset value to be applied by the UE,
   wherein the one of the plurality of TRPs indicates to the UE which configuration to apply for downlink (DL) or uplink (UL) BWP switching for transmission or reception, and
   wherein the plurality of TRPs includes the first and second TRPs.

19. The method of claim 15, wherein the one or more of the signals, channels, or resources correspond to a control resource set (CORESET),
   wherein one of a plurality of TRPs configures the UE with one or multiple CORESET configurations with the timing adjustment or frequency offset value to be applied by the UE,
   wherein the one of the plurality of TRPs indicates to the UE which configuration to apply for reception of downlink control information (DCI), and
   wherein the plurality of TRPs includes the first and second TRPs.

20. The method of claim 15, wherein the first TRP signals a time/frequency resource scheduled for the joint transmission or reception and the timing adjustment or frequency offset value applied by the first TRP for the joint transmission or reception to the second TRP,
   wherein the second TRP determines a required amount of timing adjustment or frequency offset to align a transmission or reception by the second TRP with the joint transmission or reception by the first TRP, and
   wherein the first TRP and one or multiple of other TPRs including the second TRP jointly transmit or receive the one or more of the signals, channels, or resources to or from one or multiple UEs including the UE.

* * * * *